United States Patent [19]

Stout et al.

[11] Patent Number: 5,699,632
[45] Date of Patent: Dec. 23, 1997

[54] INSULATED FISHING MITT FOR COOPERATING WITH ROD HANDLE

[76] Inventors: Luke A. Stout; Jennifer L. Stout, both of N10769 Berg Rd., Phillips, Wis. 54555

[21] Appl. No.: 591,275

[22] Filed: Jan. 25, 1996

[51] Int. Cl.$^6$ .......................... A01K 97/00; A41D 13/10
[52] U.S. Cl. .......................... 43/25; 2/17; 2/158; 2/161.1; 2/161.5
[58] Field of Search .......................... 43/25; 2/158, 161.1, 2/161.2, 161.5, 17

[56] References Cited

U.S. PATENT DOCUMENTS

| | | | |
|---|---|---|---|
| 428,115 | 5/1890 | Levy | 2/158 |
| 2,103,711 | 12/1937 | Cole | 2/158 |
| 2,611,901 | 9/1952 | Neider | 2/158 |
| 4,359,784 | 11/1982 | Harrington | 2/158 |
| 4,654,895 | 4/1987 | Peters | 2/161.1 |
| 4,683,592 | 8/1987 | Strongwater | |
| 4,727,675 | 3/1988 | Huntt | 43/25 |
| 4,805,338 | 2/1989 | Schublom | |
| 5,177,893 | 1/1993 | Huntt | |
| 5,375,263 | 12/1994 | Cuccia | 2/161.1 |
| 5,509,143 | 4/1996 | Yates | 2/158 |

FOREIGN PATENT DOCUMENTS 0165805   2/1934   Switzerland .

*Primary Examiner*—Joseph J. Hail, III
*Attorney, Agent, or Firm*—Price, Heneveld, Cooper, DeWitt & Litton

[57] ABSTRACT

A fishing mitt is provided for keeping the hand of a fisher warm while maintaining sensitivity on a fishing rod. The mitt has a shell and insulating lining configured with a size and shape to encircle the hand of a fisher. A first opening is provided through which a user may dispose a hand within the mitt. The mitt includes a second opening near the outer end of the mitt which is adapted to snugly receive a fishing rod handle extending therethrough so that the hand of the fisher may grip the rod handle in direct contact. Protective end cover containing a fastener may be unfastened to allow access to the second opening or closed to cover the second opening when the mitt is not used in cooperation with a rod handle.

9 Claims, 2 Drawing Sheets

5,699,632

INSULATED FISHING MITT FOR COOPERATING WITH ROD HANDLE

BACKGROUND OF THE INVENTION

1. Technical Field

The present invention relates generally to a mitt to be worn on the hand of a fisher and, more particularly, to a mitt for enclosing the hand and cooperating with a fishing rod handle to provide warmth of the hand and allow good sensitivity to rod movement, especially in cold weather conditions.

2. Discussion

For cold weather fishing there is the need to provide a fisher with the ability to fish in the cold weather environment while keeping the hands of the fisher warm and dry. Unprotected hands generally cannot be exposed to low temperatures for extended time periods without the fingers becoming cold and numb and therefore susceptible to reduced ability to sense the bite of a fish. Consequently, less sensitive bites tend to go undetected under these conditions. Modern fishing technology includes high modulus graphite rods, light weight line and small reels to aid in the detection of less sensitive bites, especially when fish are in a non-aggressive feeding mood. For example, light weight jigs are often employed with fishing line having a strength of less than one pound to trigger fish, such as panfish, into biting. Reaction time between detecting a bite and setting the hook also improves when the bare hand is in direct contact with the rod handle thereby allowing optimal sensing via the hand to feel movement of the rod. This is also important as many fish have the ability to remove the bait from the hook and/or exhale the hook from the mouth of the fish in a fraction of a second.

In lieu of protective cold weather clothing, fishing shelters have been employed, most notably for ice fishing and often in combination with a heater to protect the fisher from cold weather and keep the hands of the fisher warm. However, the additional cost of a fishing shelter is significant and such shelters generally reduce mobility of the fisher which reduces the ability to quickly and easily move from one location to another in search of fish. Even the conventional portable shelters often must be loaded and unloaded from a vehicle and transported across the ice. In addition, many shelters are bulky and require a truck or trailer for transportation and further often require storage in a protective shelter during the off season.

In lieu of a fishing shelter, protective gloves or mitts can be worn over the hands of a fisher to allow the fisher to remain warm in a cold weather environment. Conventional all purpose mitts can be worn to keep the hands of the fisher warm and dry; however, the typical conventional style of mitt requires a fisher to grip the handle of a fishing rod via the mitt so that the rod handle is in contact with the exterior surface of an outer shell of the mitt. Protective gloves and mitts commonly contain one or more insulating layers attached or otherwise disposed within the outer shell and therefore located between the hand of the fisher and the fishing rod handle. The presence of the insulating layer has a cushioning or a dampening effect which substantially reduces sensitivity and therefore the ability of the fisher to feel a fish biting. With reduced sensitivity, the ability to detect when a fish is biting or striking at a bait or lure is therefore diminished. The need for good sensitivity is especially important in cold weather conditions when fish are generally more apt to be less aggressive. Accordingly, loss of sensitivity decreases the ability to determine if a bite occurred and therefore decreases the chances of catching fish.

U.S. Pat. Nos. 4,805,338 and 5,177,893 disclose insulated fishing mitts for keeping the hand of the fisher warm while fishing with a rod and reel. The aforementioned patents are hereby incorporated by reference. The approach discussed in U.S. Pat. No. 4,805,338 provides a main body and double cuff portion with the main body having two adjoining break-apart edges so that the mitt can be peeled back over the forearm to expose the hand and allow the fisher to land a fish. The other approach discussed in U.S. Pat. No. 5,177,893 provides a mitt having a shell with a pair of openings for receiving the rod so opposite portions of the rod extend from opposite portions of the shell and has another opening so that a strut connected to the reel on a fishing rod is allowed to remain outside the shell and in cooperation with a digit on the hand of the glove to enable manipulation of the bail of the reel. This requires that the mitt be attached to the rod and reel, making it difficult to quickly separate the rod and reel from the mitt. Further, this type of mitt has numerous openings which decreases the thermal efficiency.

It is therefore desirable to provide for a mitt which keeps the hand of a fisher warm and cooperates with a fishing rod handle, while maintaining good sensitivity to rod movement to aid in detecting fish bites.

It is further desirable to provide for an insulated fishing mitt that cooperates with a fishing rod handle so the hand of a fisher can directly grip the rod handle, yet remain protected from the elements of a cold weather environment.

It is also desirable to provide for such an easy-to-use fishing mitt that may receive and interact with a fishing rod handle and further which may be easily separated from the fishing rod handle while requiring little effort and consuming little time.

Yet, it is also desirable to provide for such a fishing mitt which has a closure for covering a rod handle opening and allowing for conventional use of the mitt in a cold weather environment when the mitt is not used in cooperation with a fishing rod handle.

SUMMARY OF THE INVENTION

In accordance with the teachings of the present invention, an insulated fishing mitt is provided for cooperating with the handle of a fishing rod and keeping the hand of a fisher warm, while maintaining good sensitivity to detect movement of the fishing rod. The mitt has a shell and insulating lining configured with a size and shape to encircle the hand of a fisher with a first opening provided at one end of the mitt through which a user may dispose a hand within the mitt. The mitt further includes a second opening preferably provided near the outer end of the mitt. The second opening is adapted to snugly receive a fishing rod handle extending therethrough so that the enclosed hand of the fisher may grip the rod handle in direct contact therewith. A protective end cover is also provided near the outer end of the mitt, and the cover has a fastener disposed thereon to allow for opening and closing of the cover. The cover may be opened to allow access to the second opening or closed to cover the second opening when the mitt is not used in cooperation with a rod handle.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
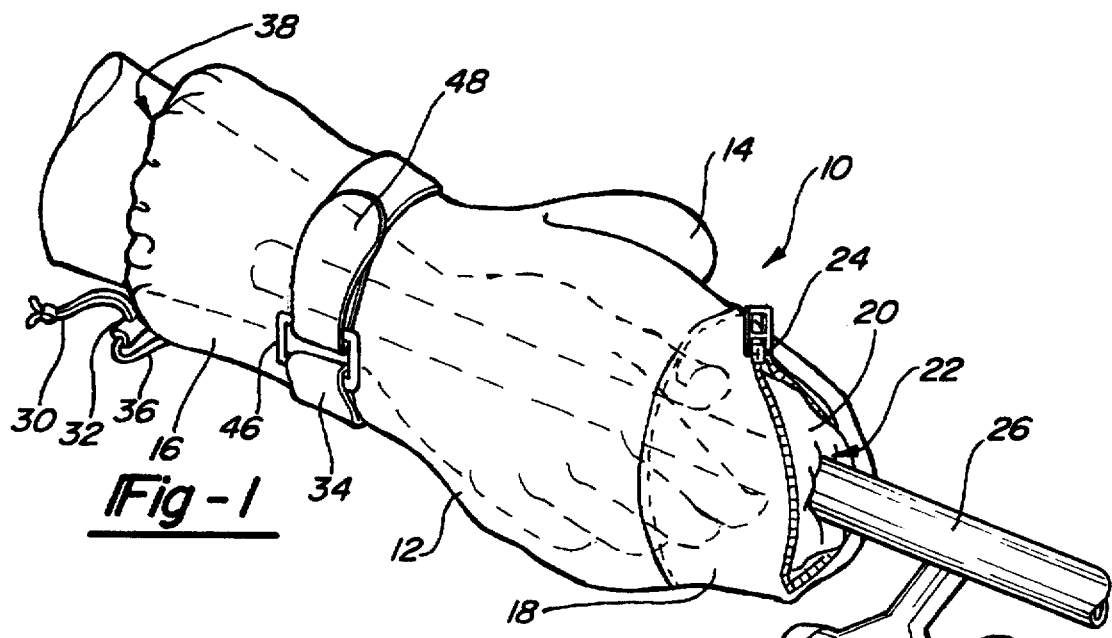
FIG. 1 is a side view of a fishing mitt with a hand shown in phantom inside the mitt and in cooperation with a fishing rod handle according to the present invention.

Turning now to FIG. 1, a mitt 10 is shown worn over the hand of a fisher and cooperating with a handle 26 of a fishing rod. Mitt 10, according to the preferred embodiment of the present invention, is adapted to cooperate with fishing rod handle 26 to allow a fisher to realize optimal sensitivity to movement of the rod and yet keep the enclosed hand warm during cold weather fishing. The fishing rod handle 26 is shown equipped with a fishing reel 28 of the conventional spinning reel type; however, a variety of fishing rods equipped with any of a variety of rod handles and reels may be used in cooperation with fishing mitt 10.

Generally speaking, mitt 10 is provided with a main body portion 12, a thumb portion 14, and a cuff portion 16, and is configured with a shape and size to encircle the hand as well as the adjoining wrist and a portion of the forearm as shown. The thumb portion 14 is adapted to enclose the thumb and the main body portion 12 is adapted to enclose the remainder of the hand including the remaining fingers. Alternately, mitt 10 could be provided without thumb portion 14 leaving the thumb also enclosed within the main body portion 12. The cuff portion 16 is adapted to cover the fisher's wrist and a portion of the forearm and has a cuff opening 38 provided at the end through which the hand, wrist and forearm of a fisher may enter into and exit from mitt 10.

Fishing mitt 10 is configured with an opening 22 preferably provided in a central outer end portion 20 of the main body portion 12. By way of opening 22, mitt 10 is adapted to receive a fishing rod handle 26, generally of the type containing a fishing reel 28. With the rod handle 26 received and extending through opening 22 and therefore engaged in cooperation with mitt 10, the reel 28 has a mount on the fishing rod at a point extending beyond the outermost end of the mitt 10. According to this arrangement, the bail and crank handle of fishing reel 28 can be manipulated with the fisher's other hand without interference from mitt 10.

The end portion 20 of main body portion 12 containing opening 22 is further surrounded by an outer protective end cover 18. According to one embodiment, cover 18 is made up of an outer shell that is sewn or otherwise attached to main body portion 12 and preferably contains a slide fastener (i.e., zipper) 24. Protective end cover 18 may be opened to expose opening 22 so that the fishing rod handle 26 can be extended through opening 22. When mitt 10 is not used in cooperation with fishing rod handle 26, zipper 24 may be slidably fastened (i.e., closed) to cover the opening 22 with protective end cover 18, thereby preventing exposure of the enclosed hand to cold weather elements through opening 22. While a zipper 24 is shown and described herein, it should be appreciated that alternate fasteners such as hook and loop fasteners (Velcro), snap type fasteners or other fasteners may be employed.

Figure 2:
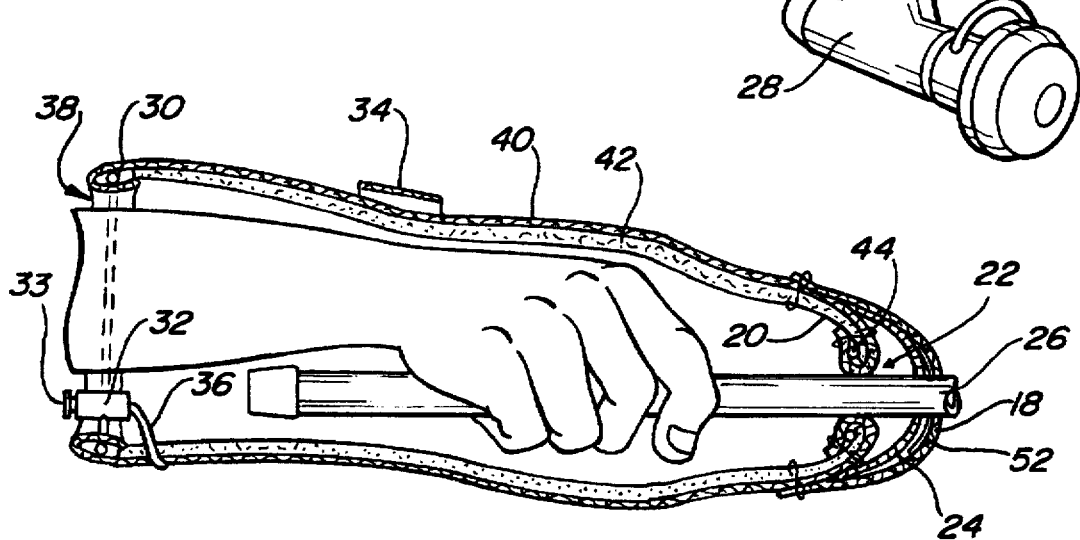
FIG. 2 is a cross-sectional side view of the fishing mitt taken through a central portion thereof and further illustrates the hand in direct contact with the fishing rod handle.

Referring to FIG. 2, mitt 10 is further shown in a cross-sectional view with the hand of a fisher in direct contact and gripping the fishing rod handle 26 inside the mitt 10. The fingers and palm of the hand grip rod handle 26 and therefore can sense movement and quickly react to manipulate the rod handle 26. In addition, the thumb preferably is also placed in contact with rod handle 26 within main body portion 12.

Mitt 10 has an exterior shell 40 and a thermal insulating lining 42 disposed within the exterior shell 40. Exterior shell 40 is made of a durable material that is preferably breathable, wind proof and water resistant. As examples, exterior shell 40 may include Gortex® which is commercially available from W. L. Gore & Associates or Nylon Cordura® which is commercially available from E. I. DuPont De Nemours & Co., Inc. The front side of exterior shell 40 may further contain a frictional non-slip material sewn or otherwise attached thereon near the palm and other areas of the mitt 10 for realizing enhanced gripping ability. The thermal insulating lining 42 is made of suitable insulating material such as Polartec® which is commercially available from Malden Mills Industries, Inc. Wool, fleece, or Thinsulate® which is commercially available from Minnesota Mining and Manufacturing Company, or various other synthetic or natural materials may also be used for insulating lining 42. Exterior shell 40 and thermal insulating lining 42 together make up cuff portion 16, thumb portion 14 and main body portion 12 including end portion 20. Accordingly, opening 22 extends through exterior shell 40 and thermal insulating lining 42.

Encircling opening 22 is a resilient elastic band 44 generally disposed within and attached to an expandable bunched portion of the material making up exterior shell 40 of the end portion 20 of main body portion 12. Elastic band 44 can be stretched to receive the fishing rod handle 26 when handle 26 is inserted within the opening 22. With the rod handle 26 inserted in opening 22, elastic band 44 and opening 22 provide a snug fit around the fishing rod handle 26. This further seals the inside of mitt 10 from cold weather elements of the outside environment.

The protective end cover 18 is provided as an extended outer shell material that is preferably sewn or otherwise attached to the exterior shell 40. Alternately, protective end cover 18 could be provided as part of exterior shell 40, with the end portion 20 provided as a shell or lining material sewn or otherwise attached to the inside of mitt 10. According to the preferred embodiment, protective end cover 18 may include a durable material of the type used to make up exterior shell 40. The slide fastener (i.e., zipper) 24 is shown configured on the back side of protective end cover 18 while opening 22 is preferably provided near the central tip of main body portion 12. Accordingly, the zipper 24 is less noticeable and less likely to interfere with use of the mitt 10, especially when the zipper 24 is fastened. Also, an insulation lining pad 52 is attached to the inner surface of protective end cover 18 and directly faces and abuts opening 22 when zipper 24 is fastened shut. This further prevents heat loss through opening 22 and enhances the thermal efficiency of mitt 10.

Mitt 10 is further equipped with an adjustable elastic draw cord 30 located near the outer end of cuff portion 16. Draw cord 30 is attached to a draw cord locking mechanism 32 which allows a user to adjust the elastic draw cord 30 to adjust the size of cuff opening 38 and achieve a snug fit of the cuff portion 16 around the forearm of a fisher. This further prevents heat loss through cuff opening 38. Locking mechanism 32 has a spring loaded clamp (not shown) for locking draw cord 30 in place and a depressible button 33 for releasing the clamp. Locking mechanism 32 is further attached to mitt 10 by way of anchor cord 36. Attachment of locking mechanism 32 by way of anchor cord 36 allows a user to easily pull the draw cord through locking mechanism 32 with one hand without requiring use of a second hand. This is because anchor cord 36 holds locking mechanism 32 in place while the draw cord 30 is pulled through locking mechanism 32.

Figure 3:
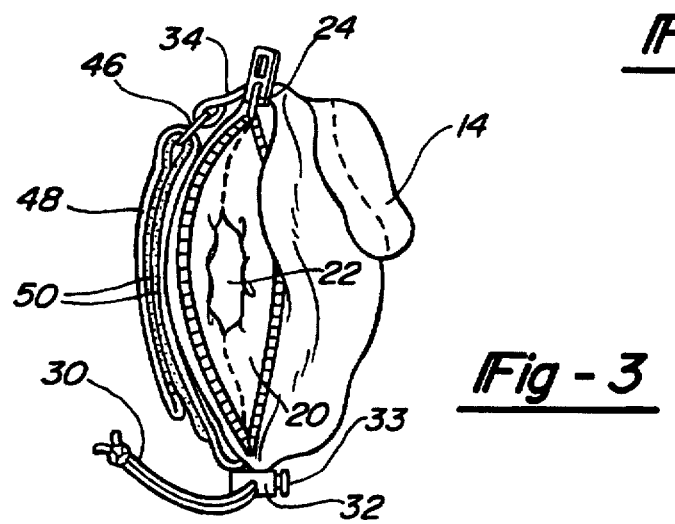
FIG. 3 is an end view of the fishing mitt illustrating a protective end cover in the open position and exposing an opening which is adapted to receive the fishing rod handle.

With particular reference to FIG. 3, the mitt 10 is further shown from an end view with zipper 24 unfastened and thereby exposing opening 22. As shown, mitt 10 further includes an adjustable strap 48 provided on the back side of mitt 10 and in cooperation with support member 34 and slide ring 46. Adjustable strap 48 contains hook and loop fasteners (Velcro) 50 on opposing surfaces of strap 48. Accordingly, adjustable strap 48 loops through slide ring 46 and may be tightened and held in place via hook and loop fasteners 50 to provide a snug fit about the wrist of the user.

Accordingly, fishing mitt 10 of the present invention provides an easy-to-use mitt which keeps the hand of a fisher warm while fishing and allows the fisher to directly contact the fishing rod handle 26 to provide good sensitivity to the bite or strike of a fish. Furthermore, mitt 10 may easily receive a fishing rod handle 26 simply by extending the rod handle 26 through exposed opening 22 with the zipper 24 unfastened without requiring removal of the hand from mitt 10. Likewise, fishing rod handle 26 can easily be removed from mitt 10 by sliding the rod handle 26 out through opening 22. When mitt 10 is not used in conjunction with the fishing rod handle 26, the zipper 24 may be slideably fastened to close the outer cover 18 and to seal opening 22 from the outside environment in a relatively easy to use manner.

Figure 4:
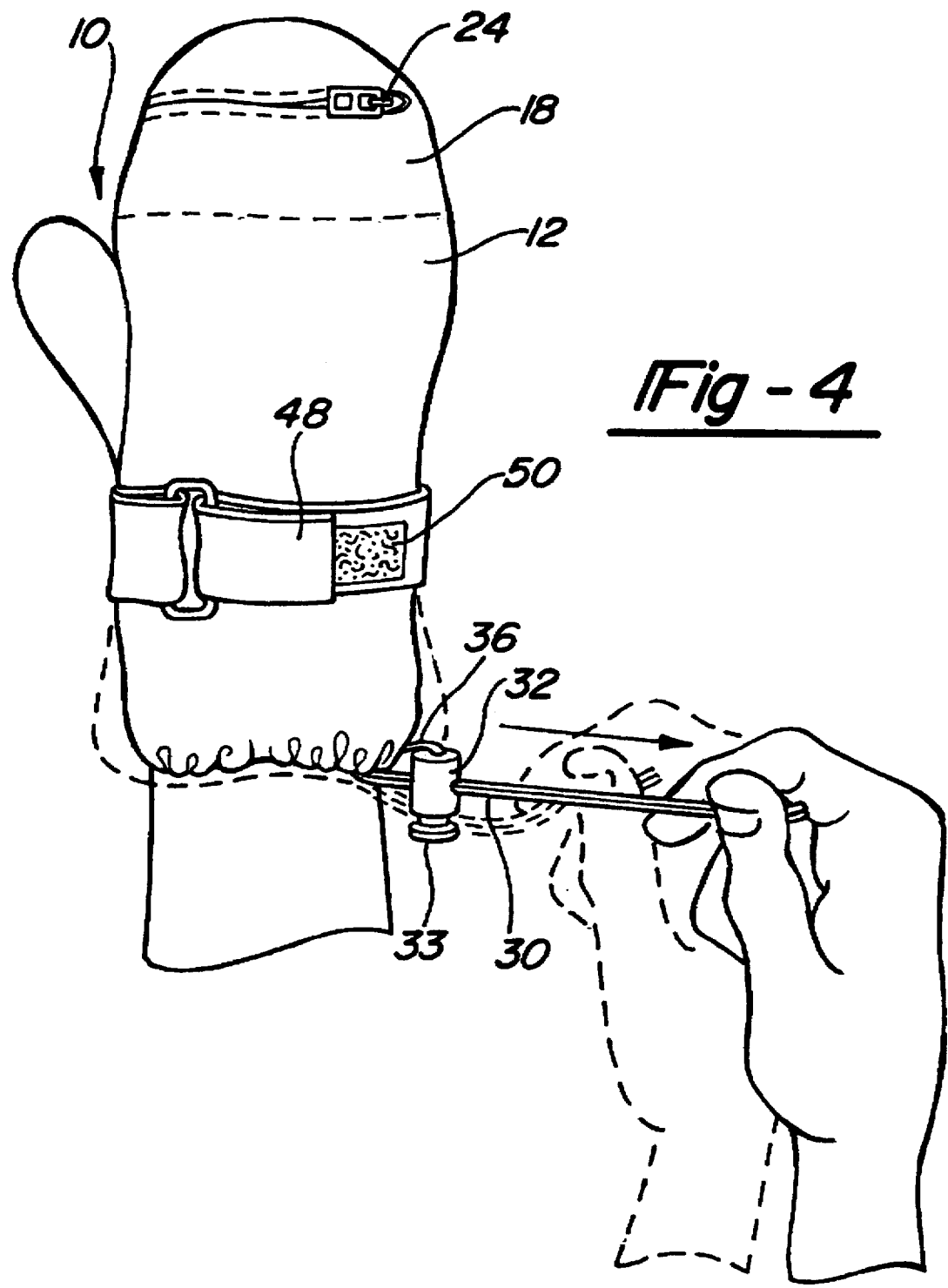
FIG. 4 is a view of the back side of the mitt illustrating the protective end cover in the closed position surrounding the opening and further illustrating adjustment of an elastic draw strap.

Referring to FIG. 4, mitt 10 is shown with zipper 24 fastened across the backside of mitt 10. In this position, the zipper 24 remains on the backside and therefore generally does not interfere with normal use of mitt 10. This further enables mitt 10 to be used for general purposes such as traveling to an ice fishing location and preparing for fishing including cutting holes in the ice, etc. Also shown in FIG. 4 is the adjustment of draw cord 30 via a remote hand to tighten the cuff portion around the wrist of the user. By simply pulling the end of draw cord 30, cord 30 slides through locking mechanism 32 and automatically locks in place, while cord 36 holds locking mechanism 32 in place.

The mitt 10 according to one embodiment of the present invention may be easily used to cooperate with a fishing rod handle 26 to keep the hands of a fisher warm in a cold weather environment while allowing sensitivity to movement of the rod handle 26. However, it should be appreciated that the mitt 10 may be used in cooperation with other objects for various applications without departing from the spirit of this invention. For example, mitt 10 could cooperate with a bow string release for purposes of target shooting or hunting with a bow and arrow, especially in a cold weather environment. It should be appreciated that yet other applications of mitt 10 may be conceivable.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A mitt to be worn on the hand of a fisher for use in combination with a fishing rod, said mitt comprising:

a shell having a size and shape to encircle the hand of a fisher, the shell including a thumb portion and a main body portion configured such that the mitt has a front side for covering a palm side of the hand and a back side for covering a back side of the hand;

a first opening provided at one end of the shell through which a fisher may dispose a hand within the shell;

a second opening provided at a second end substantially opposite the first end, said second opening adapted to receive a fishing rod handle extending therethrough so that the hand of the fisher may grip the rod in direct contact; and a cover provided at said second end of the shell and having fastener means disposed thereon for opening the cover as to allow access to the second opening and for closing the cover so as to cover the second opening, wherein the cover includes a first flap and a second flap fastenable together by the fastener means on the back side of the mitt so that the first flap overlays the second opening when the cover is closed.

2. The mitt as defined in claim 1 wherein said second opening is encircled by an elastic material which defines size and shape of the second opening to provide a snug fit around the fishing rod handle.

3. The mitt as defined in claim 1 further comprising a cuff portion connected to the shell and having one end providing the first opening.

4. The mitt as defined in claim 1 further comprising thermal insulating material disposed inside the shell.

5. The mitt as defined in claim 1 wherein the cover comprises an extended outer shell attached to the shell, said outer shell formed by the first and second flaps and having an opening that is closeable with the fastener means.

6. The mitt as defined in claim 1 wherein said fastener means comprises a zipper.

7. A mitt to be worn on the hand of a user for use in combination with a shaft member, said mitt comprising:

a shell having a size and shape to encircle the hand of a user, the shell including a thumb portion and a main body portion configured such that the mitt has a front side for covering a palm side of the hand and a back side for covering a back side of the hand;

a first opening provided at one end of the mitt through which a user may dispose a hand within the shell;

a second opening provided at a second end opposite the first end, said second opening adapted to receive a shaft member extending therethrough so that the hand of the user may grip the shaft member; and a closure provided at said second end of the mitt and having a fastener disposed thereon to allow the user to open and close the second opening, wherein the closure includes a first flap and a second flap fastenable together by the fastener on the back side of the mitt so that the first flap overlays the second opening when the closure is closed.

8. The mitt as defined in claim 7 wherein said closure comprises a cover containing an opening engaged by said fastener, said cover being openable to expose the second opening and further being closeable to cover the second opening.

9. A mitt to be worn on the hand of a fisher and used in combination with a fishing rod, said mitt comprising:

a shell having a size and shape to encircle the hand of a fisher, the shell including a thumb portion and a main body portion configured such that the mitt has a front side for covering a palm side of the hand and a back side for covering a back side of the hand;

a first opening through which a fisher may dispose a hand within the shell;

a second opening located substantially at an outermost end of the mitt and having a size and shape to receive a handle of the fishing rod extending therethrough;

a cover provided at the second end of the shell and having a fastener disposed thereon for opening the cover so as to allow access to the second opening and for closing the cover so as to cover the second opening, wherein the cover includes a first flap and a second flap fastenable together by the fastener on the back side of the mitt so that the first flap overlays the second opening when the cover is closed; and a fishing rod handle extending through said second opening when the cover is opened so that the hand of the fisher may grip the rod in direct contact therewith.

* * * * *